June 28, 1960 A. SCHRIESHEIM 2,943,126
LIQUID CATALYST PARAFFIN ALKYLATION PROCESS
Filed Sept. 26, 1958
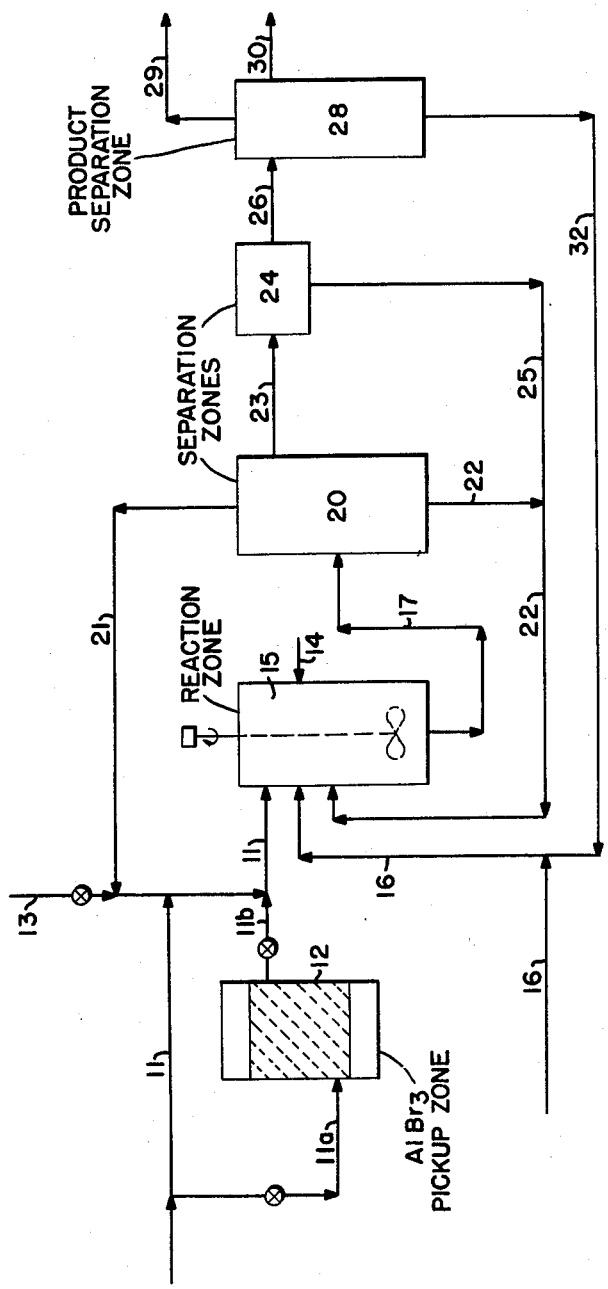
Alan Schriesheim Inventor
By Byron O. Dimmick Attorney

United States Patent Office 2,943,126
Patented June 28, 1960

2,943,126

LIQUID CATALYST PARAFFIN ALKYLATION PROCESS

Alan Schriesheim, Fords, N.J., assignor to Esso Research and Engineering Company, a corporation of Delaware Filed Sept. 26, 1958, Ser. No. 763,492

7 Claims. (Cl. 260—683.53)

This invention concerns a process in which butanes and/or pentanes are alkylated with a higher paraffin hydrocarbon to furnish branched chain paraffin hydrocarbons boiling in the motor fuel range. In particular the invention concerns a process in which a liquid catalyst complex comprising aluminum bromide and bromine is employed to effect a simultaneous cracking, isomerization and alkylation reaction involving isobutane and/or isopentane and a paraffin hydrocarbon of from 6 to 18 carbon atoms under conditions that favor the formation of high yields of branched chain paraffin hydrocarbons of 5 to 7 carbon atoms.

With the increased use of modern high compression engines in the automotive industry the petroleum refiners have encountered a major problem in supplying a sufficient quantity of motor fuels of high octane rating to satisfy the requirements of those engines. Heretofore the supply of gasoline components has been augmented by using $C_3$ and $C_4$ petroleum fractions as starting materials for making higher hydrocarbons principally by polymerization and alkylation processes. Thus for example, isobutane can be reacted with butylene in the presence of sulfuric acid to give a branched chain 8-carbon-atom alkylate. Also butylene can be polymerized to a $C_8$ unsaturated hydrocarbon which upon hydrogenation will give isooctane. These processes have some disadvantages in that they require a number of separate operations and in that they necessitate the use of olefins which are usually in relatively limited supply.

It has now been found that butanes and pentanes can be reacted directly with higher paraffin hydrocarbons to give good yields of $C_5$ to $C_7$ saturated branched chain hydrocarbons of high octane rating if a catalyst complex is employed comprising aluminum bromide and bromine or chlorine. Bromine is preferred. The catalyst is in the liquid state and can be readily separated from the reaction products and recycled to the reaction zone. The catalyst exhibits markedly greater activity than the catalysts previously proposed for conducting reactions of this type. Reaction temperatures are relatively low and range from about 30° to 140° F. The pressures employed are sufficient to keep the reacting hydrocarbons in the liquid phase. The preferred temperature range is from about 50° to about 120° F.

The nature and objects of this invention will be more easily understood when reference is made to the accompanying drawing in which the single figure is a schematic flow plan of one process for practicing the invention.

The process will be described with particular reference to the use of isobutane as the lighter component. Referring now to the drawing in detail, isobutane from a suitable source is conducted by means of line 11 into a stirred reaction zone 15 containing a liquid catalyst complex comprising aluminum bromide in admixture with a halogen from the class of chlorine and bromine. A portion of the isobutane stream may be diverted by means of lines 11a and 11b through an aluminum bromide pick up vessel 12 for for the purpose of replacing aluminum bromide that may be lost from the system by solution in the product stream.

A stream of a higher paraffin hydrocarbon, as for example, heptane, octane, or cetane, or of mixtures containing the higher paraffins, is conducted into the reaction zone by means of line 16. Make-up bromine may be added, if needed, to the reaction zone through line 14. Hydrogen halide promoter, e.g. HBr, may be added through line 13. If HBr is used it may be present in proportions of about 0.3 to 8.0 wt. percent based on the hydrocarbons.

The reaction product leaves the reaction zone through line 17 and is conducted into an initial separation zone 20 wherein separation of the liquid catalyst from the reaction product takes place. The settled catalyst layer may be recycled to the reaction zone by means of line 22. Light materials including unreacted isobutane and n-butane are removed overhead by means of line 21 and recycled to the reaction zone. The remainder of the reaction products may then be conducted by means of line 23 into a second separation zone 24, if necessary, for further separation of liquid catalyst from the hydrocarbons. Line 24 may comprise a centrifuge, for example. Separated catalyst is added to that in line 22 by means of line 25. The essentially catalyst-free product is sent via line 26 to a product separation zone 28, wherein various fractions including $C_5$ to $C_7$ hydrocarbons may be removed overhead or as side streams through lines 29 and 30. Heavier product materials comprising $C_8$ hydrocarbons and higher may be recycled if desired by means of line 32.

In place of isobutane, the feed in line 11 may comprise normal butane, in which case no higher hydrocarbon feed will be sent initially to the reaction zone but the butane will be recycled through line 17, zone 20 and line 21 until a considerable amount of the butane has been isomerized to isobutane. The process may then continue in the manner already described, the recycle isobutane being sufficient to make the reaction proceed, while the fresh butane becomes isomerized in the reaction zone.

A number of factors in the process of the present invention are critical to its operation in order that proper distribution of the products may be obtained. For example, at temperatures above about 140° F. considerable cracking occurs and the principal products are propane and lighter materials. Also it has been established that aluminum bromide alone or even in the presence of conventional hydrogen halide promoters such as hydrogen bromide is very much less active than the catalyst system of the present invention. On the other hand, however, hydrogen bromide may be employed along with the catalyst complexes of the present invention for even greater activity.

The catalyst complexes of this invention are prepared from mixtures of from about 20 to 100 parts of bromine per 100 parts of aluminum bromide. The preferred range is from 25 to 75 weight percent of chlorine or bromine based on the $AlBr_3$. The catalyst complex with bromine may be prepared by mixing the aluminum bromide with the halogen exterior of the reaction zone. Alternatively either of the complexes may be prepared in the reaction zone by placing a charge of aluminum bromide in the zone and conducting in the required quantity of bromine or chlorine with a portion of the hydrocarbon feed.

As a minimum it is preferred that the mole ratio of isobutane to higher paraffin in the reaction zone be at least 3 to 1. If sufficient iso-$C_4$ is not present in the reaction zone to effect alkylation of the materials obtained when a higher paraffin or other higher product of the reaction is cracked by the catalyst, catalyst sludging will result. Mole ratios as high as 10 to 1 may be employed. The feed stock must be essentially free of aromatic hydrocarbons and not more than about 0.02% of such material should be present. An added advantage is that naphthene hydrocarbons may be tolerated in the feed stock up to about 20 volume percent. With increased naphthene content the reaction severity must be increased somewhat as compared to a reaction in the absence of naphthenes. This may be accomplished by raising the temperature and/or by lowering the feed rate, for example.

To remove aromatics from the feed stock conventional techniques may be employed such as solvent extration, hydrogenation, acid treating and the like, as well as treatment with selective adsorbents such as molecular sieve zeolites. It is not necessary that the higher hydrocarbons used be individual hydrocarbons such as heptane or octane or cetane, for example, but mixtures may be used, such as a petroleum fraction containing paraffinic hydrocarbons in the range of 6 to 18 carbon atoms.

Feed rates may vary from about 0.2 to about 2 v./v./hour but are preferably in the range of about 0.3 to about 1 v./v./hour.

The following example illustrates the practice of the present invention and points up the advantages thereof.

EXAMPLE 1

Comparative tests were made in which a mixture of 160 cc. of isobutane and 40 cc. of n-heptane feed (containing 5 weight percent hexane) was stirred for 3 hours at 68° to 72° F. with 23.6 grams of aluminum bromide alone or with one of the promoters identified in Table I. At the end of each run the yield of products was determined; the results obtained are also shown in Table I.

Table I

|  | Test 1 | Test 2 | Test 3 | Test 4 |
|---|---|---|---|---|
| Catalyst, grams: |  |  |  |  |
| AlBr$_3$ | 23.6 | 23.6 | 23.6 | 23.6 |
| HBr |  | 24.0 |  |  |
| Bromine |  |  | 5.9 | 11.8 |
| Analysis of C$_5$+ Product Weight Percent: |  |  |  |  |
| iso-C$_5$ | 0.4 | 0.5 | 21.0 | 44.4 |
| n-C$_5$ | 0.3 | 3.6 | 2.3 | 6.8 |
| Total C$_5$ | 0.7 | 4.1 | 23.3 | 51.2 |
| iso-C$_6$ | 0.5 | 0.3 | 10.2 | 25.0 |
| n-C$_6$ | 0 | 0 | 0.4 | 1.0 |
| Total C$_6$ | 0.5 | 0.3 | 10.6 | 26.0 |
| iso-C$_7$ | 46.2 | 48.3 | 31.3 | 14.4 |
| n-C$_7$ | 52.6 | 47.3 | 34.4 | 8.4 |
| Total C$_7$ | 98.8 | 95.6 | 65.7 | 22.8 |

It will be seen from the results of these tests that aluminum bromide alone or even in the presence of hydrogen bromide, which is a well known promoter for aluminum bromide, was not effective in producing the desired reaction. In both Test 1 and Test 2 the major portion of the reaction products comprised C$_7$ hydrocarbon isomers. Thus aluminum bromide alone or promoted with hydrogen bromide acted principally as an isomerization catalyst for the n-heptane. On the other hand, in the tests in which bromine was employed as the promoter, high yields of C$_5$ and C$_6$ branched-chain isomers were obtained. The bromine formed a liquid complex with the aluminum bromide, the complex being present as a readily separable second phase in the reaction mixture.

It is not intended that the scope of this invention be limited to the specific examples presented, as modifications thereof within the confines of the invention as defined by the appended claims are also contemplated.

What is claimed is:

1. A process for the preparation of high octane naphtha components consisting largely of branched chain paraffin hydrocarbons of 5 to 7 carbon atoms which comprises contacting in a reaction zone a minor proportion of a straight chain paraffin hydrocarbon of from 6 to 18 carbon atoms with a major proportion of a lighter hydrocarbon selected from the group consisting of butanes and pentanes, at temperatures no higher than about 140° F., in the presence of a catalyst complex comprising aluminum bromide promoted with from 20 to 100 weight percent of a halogen selected from the group consisting of elemental bromine and elemental chlorine.

2. Process as defined by claim 1 wherein said catalyst comprises aluminum bromide and from about 25 to about 75 weight percent of bromine based on the aluminum bromide.

3. Process as defined by claim 1 wherein the temperature of the reaction is in the range of about 50° to about 120° F.

4. Process as defined by claim 1 conducted in the presence of hydrogen bromide as a promoter.

5. Process as defined by claim 1 wherein naphthenic hydrocarbons are present with said hydrocarbons of from 6 to 18 carbon atoms.

6. Process as defined by claim 1 wherein the mol ratio of said lighter hydrocarbon selected from the group consisting of butanes and pentanes to said hydrocarbon of from 6 to 18 carbon atoms in the reaction zone is in the range of from about 3 to 1 to about 10 to 1.

7. A process for the preparation of high octane naphtha components consisting principally of branched chain paraffin hydrocarbons of from 5 to 7 carbon atoms which comprises reacting a major proportion of isobutane with a minor proportion of heptane, in the liquid phase, at temperatures no higher than about 140° F., in the presence of a liquid catalyst complex comprising aluminum bromide and from about 25 to about 75 weight percent of elemental bromine, based on the aluminum bromide.

References Cited in the file of this patent

UNITED STATES PATENTS

| 2,280,748 | Calhoun | Apr. 21, 1942 |
| 2,349,458 | Owen et al. | May 23, 1944 |
| 2,369,444 | D'Ouville et al. | Feb. 13, 1945 |
| 2,370,144 | Burk | Feb. 27, 1945 |